(12) United States Patent
Ramsay, III et al.

(10) Patent No.: US 9,244,585 B2
(45) Date of Patent: *Jan. 26, 2016

(54) MOUSE MOVEMENT USING MULTIPLE THRESHOLDS UTILIZING LINEAR EXPONENTIAL ACCELERATION AND SUB-PIXEL PRECISION

(71) Applicant: International Business Machines Corporation, Armonk, NY (US)

(72) Inventors: George F. Ramsay, III, Elgin, TX (US); John F. Spannaus, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 407 days.

This patent is subject to a terminal disclaimer.

(21) Appl. No.: 13/761,823

(22) Filed: Feb. 7, 2013

(65) Prior Publication Data

US 2013/0152022 A1  Jun. 13, 2013

Related U.S. Application Data

(63) Continuation of application No. 12/244,351, filed on Oct. 2, 2008, now Pat. No. 8,407,624.

(51) Int. Cl.
  *G06F 3/048* (2013.01)
  *G06F 3/0481* (2013.01)
  *G06F 3/038* (2013.01)

(52) U.S. Cl.
  CPC .............. *G06F 3/0481* (2013.01); *G06F 3/038* (2013.01)

(58) Field of Classification Search
  CPC ................... G06F 3/033–3/03549; G06F 3/03
  See application file for complete search history.

(56) References Cited

U.S. PATENT DOCUMENTS

| | | |
|---|---|---|
| 5,661,502 A | 8/1997 | Cheng |
| 5,764,219 A * | 6/1998 | Rutledge et al. ............. 345/159 |
| 6,181,325 B1 | 1/2001 | Lee |
| 6,509,889 B2 | 1/2003 | Kamper et al. |
| 6,561,993 B2 | 5/2003 | Adapathya et al. |
| 7,190,812 B2 | 3/2007 | Ahn |
| 2005/0270288 A1* | 12/2005 | Arcas ............................ 345/428 |
| 2006/0164406 A1 | 7/2006 | Emerson et al. |
| 2007/0132733 A1* | 6/2007 | Ram ............................ 345/163 |
| 2010/0088652 A1 | 4/2010 | Ramsay, III et al. |

OTHER PUBLICATIONS

Office Action, dated Sep. 8, 2011, regarding U.S. Appl. No. 12/244,351, 19 pages.
Final Office Action, dated Mar. 14, 2012, regarding U.S. Appl. No. 12/244,351, 27 pages.
Notice of Allowance, dated Nov. 26, 2012, regarding U.S. Appl. No. 12/244,351, 23 pages.

* cited by examiner

*Primary Examiner* — Claudia Dragoescu
(74) *Attorney, Agent, or Firm* — Yee & Associates, P.C.; Damion Josephs (57) ABSTRACT

Moving a pointer in a graphical user interface environment is provided. An input comprising an initial delta value determined by a device driver is received from the device driver. The initial delta value is located in a data structure. A new delta value associated with the initial delta value is selected from the data structure. A new position of a pointer in the graphical user interface environment is calculated based on the new delta value. The new position of the pointer is sent to the graphical user interface environment for rendering.

20 Claims, 5 Drawing Sheets

```
502 {
    #define MAX_DELTA 512
    #define FLOAT_BITS 10
    #define FLOAT_MASK ((0x1<<FLOAT_BITS) - 1)

aixSetMouseAccelLUT( float A, int T )
    {
506 {
        int i;
        int T2;
        int d0,d1, d2, d3;
        uint nd;

float L = 0.5; /* sub threshold points (log)*/
        float K = 0.5;
        float A1, A2;
        uint exp_delta=0;

/* Calculate T2 threshold */
        if( A < 1.0 ){
           T2 = 120;
        }else{
           T2 = (int)(70.0 - 5.0*A);
           T2 = ( T2 < 30 ) ? 30 : T2;
        }

508 {
        /* Calculate A1 A2 acceleration values */
        A1 = 0.5 * A;
        A2 = 8.0;

d0 = (uint)( ((A1<0.25)? A1 : 0.25) * (1<<FLOAT_BITS));
        d1 = (uint)( ((A1<0.4) ? A1 : 0.4) * (1<<FLOAT_BITS));
        d2 = (uint)( ((A1<0.6) ? A1 : 0.6) * (1<<FLOAT_BITS));
        d3 = (uint)( ((A1<1.0) ? A1 : 1.0) * (1<<FLOAT_BITS));

510 {
        /* Create lut for Exponential Acceleration curve */
        lut_delta[0] = 0;
        for( i=1; i< MAX_DELTA; i++ ){
           if( (i <= 1) && (i<T) ) {
              lut_delta[i] = (d0 + lut_delta[i-1]);
           }else if( (i <= 3) && (i<T) ) {
              lut_delta[i] = (d1 + lut_delta[i-1]);
           }else if( (i <= 5) && (i<T) ) {
              lut_delta[i] = (d2 + lut_delta[i-1]);
           }else if( i <= T ){
              lut_delta[i] = (d3 + lut_delta[i-1]);
              exp_delta = lut_delta[i];
           }else if( i <= T2 ){
              lut_delta[i] = (uint)((pow(((abs(i)) - (T)),(1.0+A/16.0)))
                        * (1<<FLOAT_BITS)) + exp_delta;

nd = (uint)(A1*(1<<FLOAT_BITS))+ lut_delta[i-1];
              if(lut_delta[i] > nd )
                 lut_delta[i] = nd;
           }else{
              lut_delta[i] = (uint)(A2*(1<<FLOAT_BITS))+ lut_delta[i-1];
           }
        }
    }
```

```
void aix_accelerate(DevicePtr pDev,int *px,int *py)
{
  static int sub_pix_x = 0, sub_pix_y = 0;
  int x_fl, y_fl;
  int dx, dy, new_dx=0, new_dy=0;
  int x=*px, y=*py;

dx = ABS(x);
  dy = ABS(y);

dx = ( dx > (MAX_DELTA-1) ) ? (MAX_DELTA-1) : dx;
  dy = ( dy > (MAX_DELTA-1) ) ? (MAX_DELTA-1) : dy;

if( dx!=0 || dy!=0 ){
    if( dx >= dy ){
      new_dx = lut_delta[dx];
      new_dy = (int)((float)new_dx * (float)dy/(float)dx);
    }else{
      new_dy = lut_delta[dy];
      new_dx = (int)((float)new_dy * (float)dx/(float)dy);
    }
  } x_fl = (sub_pix_x + SIGN(x)*new_dx);
  x = SIGN(x)*((ABS(x_fl)+ (1<<(FLOAT_BITS-1)))>>FLOAT_BITS);
  sub_pix_x = SIGN(x_fl) * (ABS(x_fl) - (ABS(x) << FLOAT_BITS));

y_fl = (sub_pix_y + SIGN(y)*new_dy);
  y = SIGN(y)*((ABS(y_fl)+ (1<<(FLOAT_BITS-1)))>>FLOAT_BITS);
  sub_pix_y = SIGN(y_fl) * (ABS(y_fl) - (ABS(y) << FLOAT_BITS));

MOUSE MOVEMENT USING MULTIPLE THRESHOLDS UTILIZING LINEAR EXPONENTIAL ACCELERATION AND SUB-PIXEL PRECISION

This application is a continuation of application Ser. No. 12/244,351, filed Oct. 2, 2008, status pending, the entirety of which is incorporated by reference herein.

BACKGROUND OF THE INVENTION

1. Field of the Invention

The present invention relates generally to mouse pointers and more specifically to a method, computer program product, and data processing system for moving a pointer in a graphical user interface environment.

2. Description of the Related Art

In a Graphical User Interface (GUI) environment, such as Microsoft Windows®, the mouse pointer plays an important role in manipulating items in the GUI. Windows is a registered trademark of Microsoft Corporation. The pointer can be moved across the screen using input devices such as a mouse. In Advanced Interactive Executive (AIX®) operating systems these input devices produce ticks which the driver converts to deltas in the X and Y axis. AIX is a registered trademark of International Business Machines Corporation. A tick is the amount of acceleration. The deltas will be larger when the input device is moved at a faster velocity in a specific amount of time, and will produce small deltas when the input device is moved at a slower velocity. The Windows system is responsible for reading the X, Y deltas the mouse driver produces. The Windows system may increase or decrease the deltas based on the user's mouse acceleration and threshold setting. As long as the mouse deltas are smaller than the mouse threshold setting, the Windows system will not change the deltas and will move the mouse pointer the same amount. If the delta reaches or exceeds the threshold, the delta is multiplied by the user's acceleration.

BRIEF SUMMARY OF THE INVENTION

According to one embodiment of the present invention, a pointer in a graphical user interface environment is moved. An input comprising an initial delta value determined by a device driver is received from the device driver. The initial delta value is located in a data structure. A new delta value associated with the initial delta value is selected from the data structure. A new position of a pointer in the graphical user interface environment is calculated based on the new delta value. The new position of the pointer is sent to the graphical user interface environment for rendering.

DETAILED DESCRIPTION OF THE INVENTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
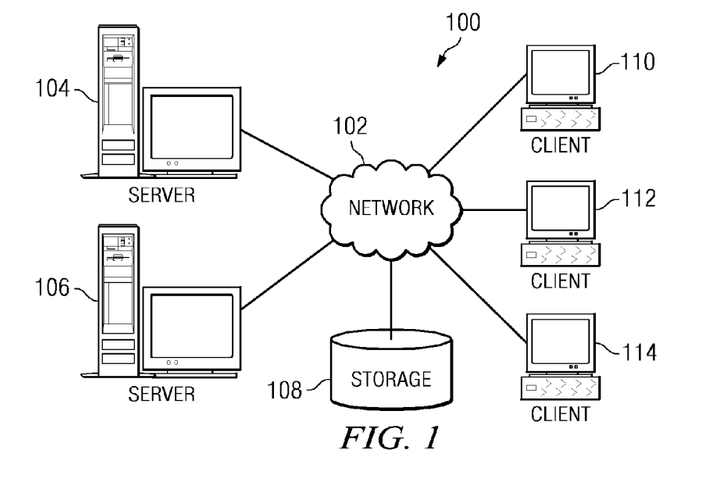
FIG. 1 is a pictorial representation of a network of data processing systems in which illustrative embodiments may be implemented.
Figure 2:
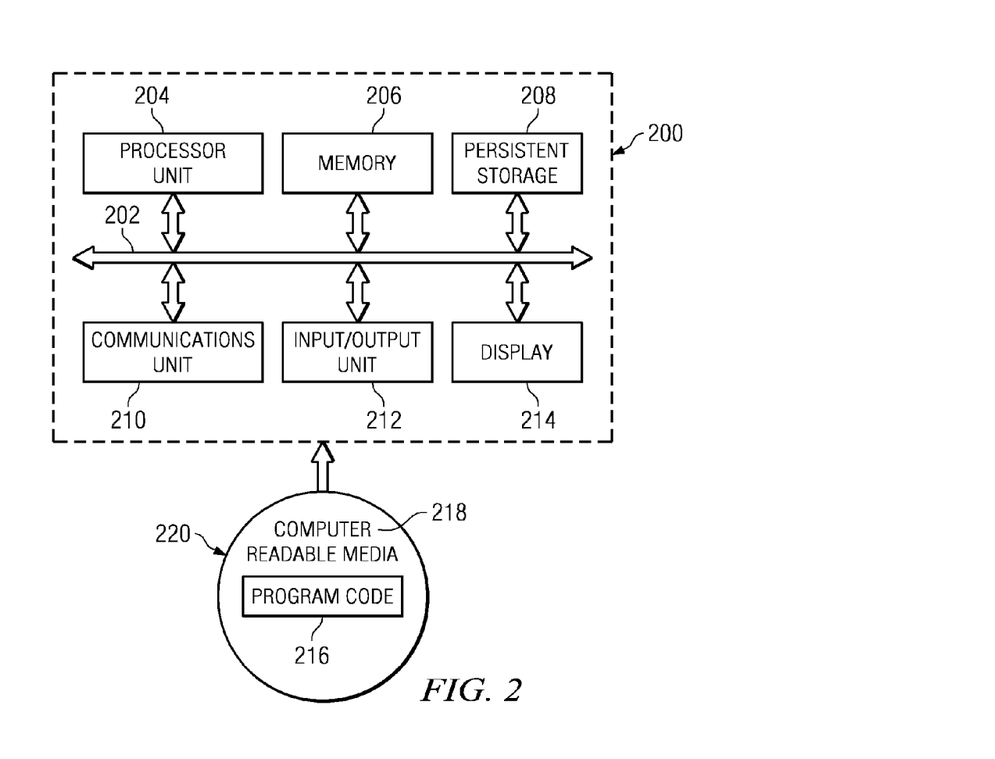
FIG. 2 is a block diagram of a data processing system is shown in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
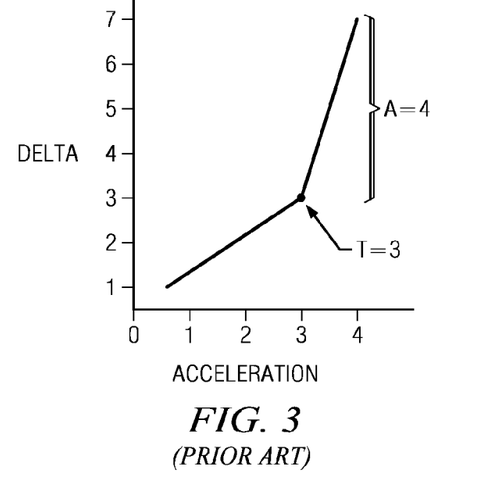
FIG. 3 shows a chart illustrating pointer movement in accordance with the prior art.

FIG. 3 shows a chart illustrating pointer movement in accordance with the prior art. In FIG. 3 the user's threshold T is set to three (3) and the acceleration A of the mouse is four (4). The mouse pointer is moved at an acceleration of one (1) until the delta reaches the threshold value of three (3). A delta is the amount of distance to move a pointer in the x-axis and/or y-axis direction in relation to the movement of the input device, such as a mouse. When the input delta reaches the threshold, the acceleration value A=4 is multiplied by the delta value, which is one in the present example, and added to the previous delta value, which is three in the present example, to obtain the new mouse delta value, which is seven (7). This delta value is how much to move the pointer in the graphical user interface environment at the present acceleration value.

This new mouse delta is used to move the mouse pointer on the screen. If the user uses a small threshold and a larger acceleration the mouse pointer will start to jump across the screen. In some cases, the mouse can become unusable since the new deltas can be quite large with a small movement of the input device.

Exemplary embodiments allow fluid mouse pointer movement with sub pixel precision with low and high mouse acceleration and thresholds. Exemplary embodiments calculate multiple acceleration and threshold values based on the user's threshold and acceleration settings to obtain new mouse pointer deltas. Exemplary embodiments use 3 acceleration values that are calculated to gradually increase the mouse movement using sub-pixel movements based on the predefined threshold values using fixed point arithmetic. A fourth threshold is used to calculate the new mouse deltas using an acceleration value less than or equal to 1 and that is half the user's acceleration value. A fifth threshold is calculated based on an algorithm using the user's acceleration value. An exponential algorithm is used until it has reached the slope of the linear algorithm. These mouse deltas are calculated once and are stored in a look up table (LUT) using fixed point arithmetic for fast retrieval later when the mouse pointer is moved. The information calculated in the LUT provides a smooth acceleration of the mouse pointer using sub-pixel precision.

Figure 4:
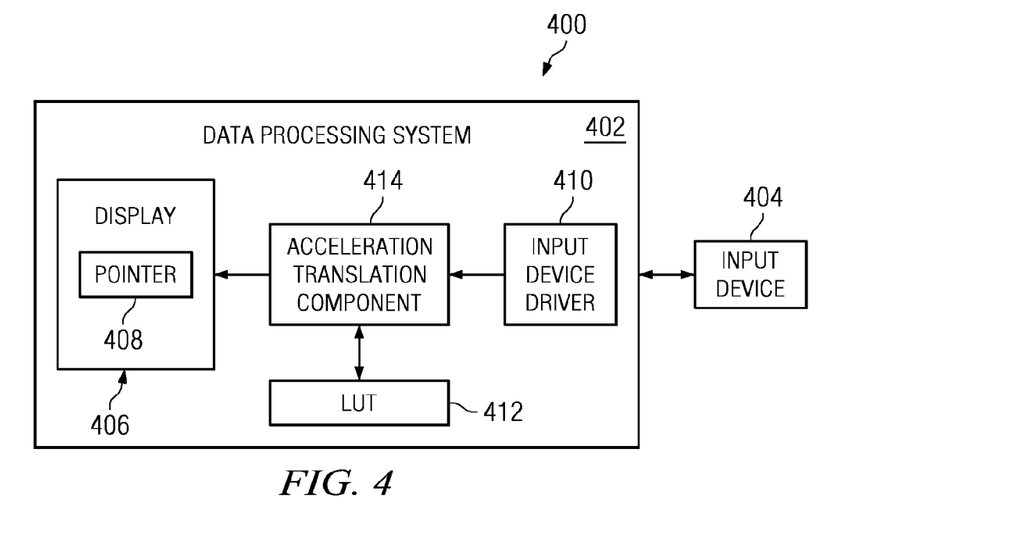
FIG. 4 is a block diagram of a system for moving a pointer in a graphical user interface environment in accordance with an exemplary embodiment.

FIG. 4 is a block diagram of a system moving a pointer in a graphical user interface environment in accordance with an exemplary embodiment. System 400 comprises data processing system 402 and input device 404. Input device 404 may be implemented as input/output unit 212 in FIG. 2. Data processing system 402 may be implemented as data processing system 200 in FIG. 2. Data processing system 402 comprises display 406, input device driver 410, acceleration translation component 414 and LUT 412. Display 406 may be implemented as display 214 in FIG. 2. LUT 412 is a data structure, such as a look up table, which is stored in memory, such as persistent storage 208 or computer readable media 218 in FIG. 2.

Acceleration translation component 414 is a software component in user space of data processing system 402. Data processing system 402 uses a graphical user interface environment, which is displayed in display 406, of which pointer 408 is a part. LUT 412 is created by acceleration translation component 414. A user inputs an acceleration setting and a threshold for input device 404. Acceleration translation component 414 uses these settings to calculate new deltas and thresholds associated with the deltas. A data structure is generated, such as a look up table, which may be implemented as LUT 412, which stores entries that comprise references to a received delta and a new delta. In an exemplary embodiment, the new deltas move the pointer at a sub-pixel level.

Device driver 410 calculates deltas that correspond to the change of position and acceleration of input device 404. These deltas are sent to acceleration translation component 414. Acceleration translation component 414 accesses LUT 412 to locate the received delta value. Acceleration translation component 414 then selects from LUT 412 the new delta value associated with the located delta value in LUT 412. Instead of moving pointer 408 the amount indicated by the delta determined by input device driver 410, the new delta value determines how much pointer 408 will actually be moved. Acceleration translation component 414 uses the new delta value to determine the new position of pointer 408. Once the new position is determined, the new position of pointer 408 is sent to the graphical user interface environment for rendering.

Figure 5A:
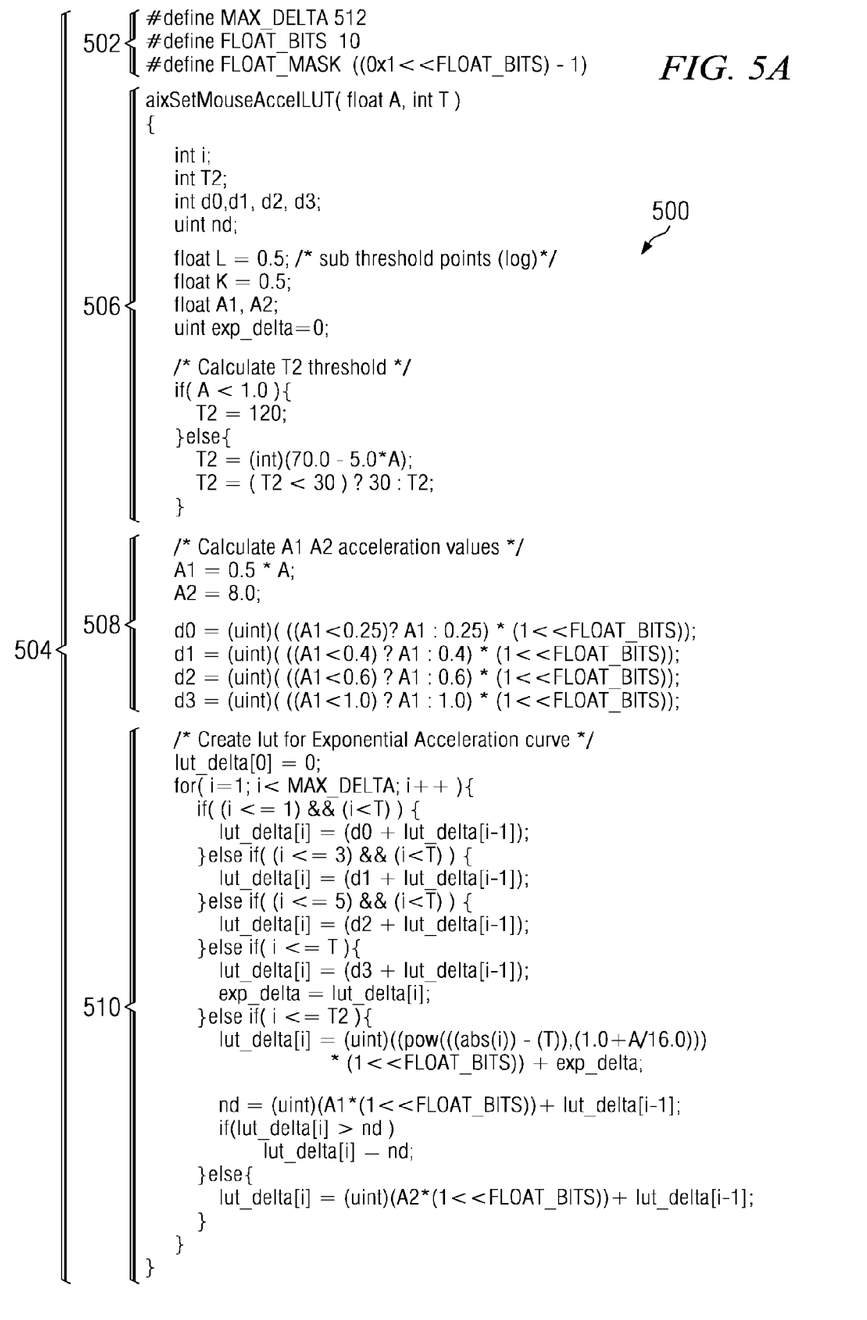
FIGS. 5A-5B show code for moving a pointer in a graphical user interface environment in accordance with an exemplary embodiment.
Figure 5B:
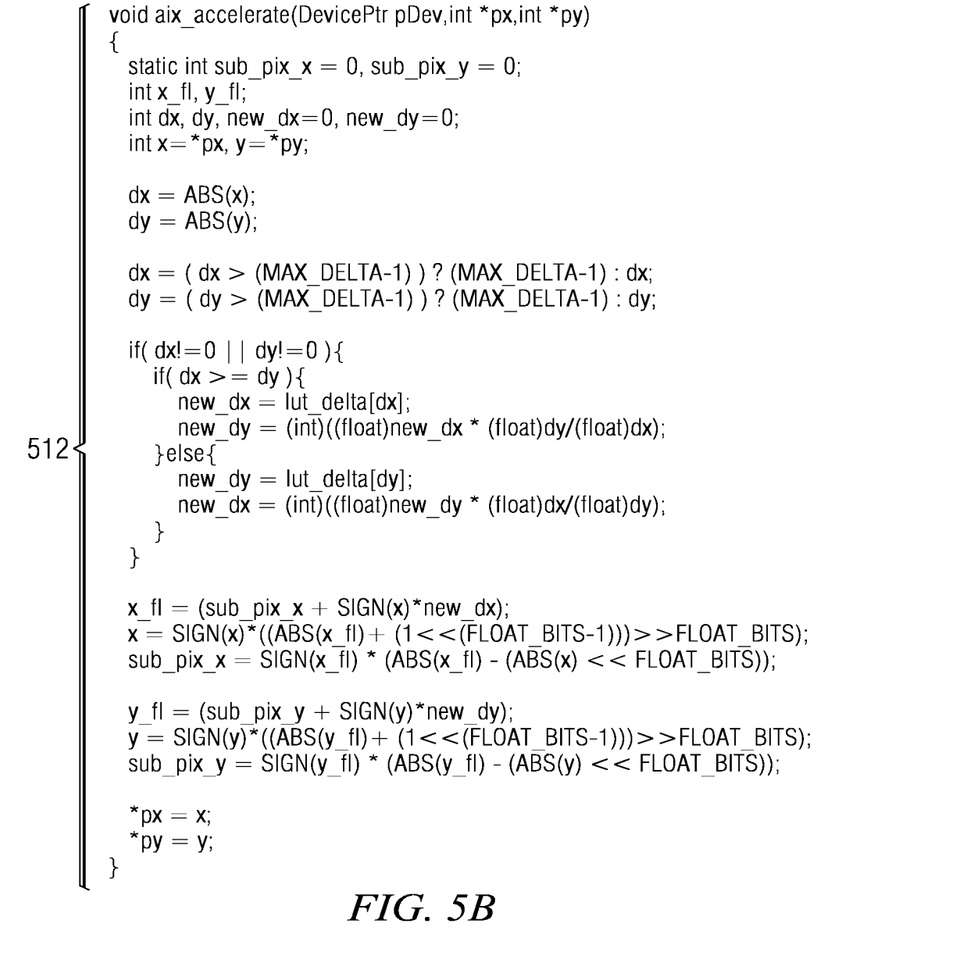

FIGS. 5A-5B show code for moving a pointer in graphical user interface environment in accordance with an exemplary embodiment. The computer code is generally designated as 500. Code 500 may be implemented as acceleration translation component 414 in FIG. 4. It should be understood that code 500 is only one exemplary embodiment of code for a pointer in accordance with an exemplary embodiment and many other forms of code could be used to achieve the same end. Code 500 is not meant in any way to limit exemplary embodiments to the specific code shown. For example, more or less than five thresholds and corresponding new deltas could be used in other exemplary embodiments. Further, the specific thresholds used, such as 1, 3, and 5 are only examples and other values chosen by a user can be used for threshold values in other exemplary embodiments.

Code portion 502 comprises the maximum entries in the look up table and the basic definitions for the fixed point arithmetic calculations performed. Code portion 504 is the portion of code 500 that generates a look up table, which is stored in a data structure that contains the entries for received deltas to corresponding new delta values. The generated lookup table is only created once unless the user setting for the acceleration value, float A, and user threshold value, int T, are changed by the user, in which case, the look-up table is updated with the new calculated values. Code portion 506 defines and calculates certain variables and thresholds used in generating the look up table. Code portion 508 shows other calculated variables, including the new deltas, used in the look up table. Code portion 510 is the portion of the code that generates the look up table. The generated look up table may be implemented as LUT 412 in FIG. 4. Code portion 512 is the portion of code 500 that calculates the new position of a pointer in a display, such as pointer 408 in display 406 of FIG. 4, according to the new deltas retrieved from the lookup table created by code portion 510.

Figure 6:
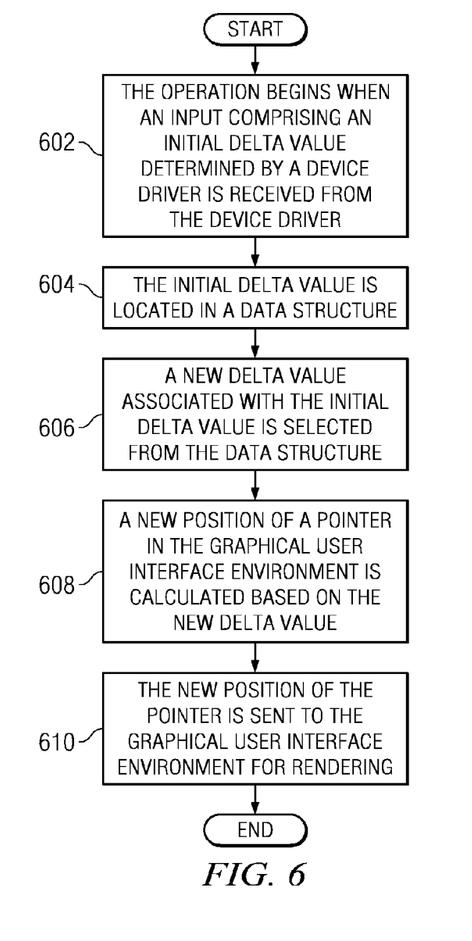
FIG. 6 is a flowchart illustrating the operation of moving a pointer in a graphical user interface environment in accordance with an exemplary embodiment.

FIG. 6 is a flowchart illustrating the operation of moving a pointer in graphical user interface environment in accordance with an exemplary embodiment. The operation of FIG. 6 may be implemented in acceleration translation component 414 in FIG. 4. The operation begins when an input comprising an initial delta value determined by a device driver is received from the device driver (step 602). The initial delta value is located in a data structure (step 604). A new delta value associate with the initial delta value is selected from the data structure (step 606). A new position of a pointer in the graphical user interface environment is calculated based on the new delta value (step 608). The new position of the pointer is sent to the graphical user interface environment for rendering (step 610) and the operation ends.

Figure 7:
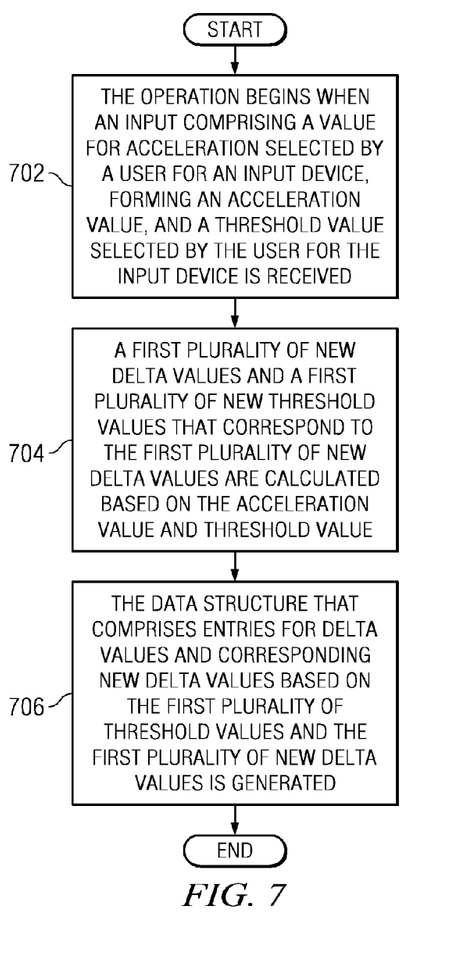
FIG. 7 shows a flowchart illustrating the operation of creating a data structure in accordance with an exemplary embodiment.

FIG. 7 shows a flowchart illustrating the operation of creating a data structure in accordance with an exemplary embodiment. The operation of FIG. 7 may be implemented in acceleration translation component 414 in FIG. 4. The operation begins when an input comprising a value for acceleration selected by a user for an input device, forming an initial acceleration value, and an initial threshold value selected by the user for the input device is received (step 702). A first plurality of new delta values and a first plurality of new threshold values that correspond to the first plurality of new delta values are calculated based on the initial acceleration value and the initial threshold value (step 704). The data structure that comprises entries for initial delta values and corresponding new delta values based on the first plurality of new threshold values and the first plurality of new delta values is generated (step 706) and the operation ends. In an exemplary embodiment when either an updated acceleration value or a an updated threshold value for the input device is received, a second plurality of new delta values and a second plurality of new threshold values that correspond to the second plurality of new delta values are calculated. Entries in the data structure are updated with initial delta values and corresponding new delta values based on the second plurality of new threshold values and the second plurality of new delta values.

Thus, exemplary embodiments allow fluid mouse pointer movement with sub pixel precision with low and high mouse acceleration and thresholds. Exemplary embodiments calculate multiple acceleration and threshold values based on the user's threshold and acceleration settings to obtain new mouse pointer deltas.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for moving a pointer in a graphical user interface environment, the computer implemented method comprising:
    a computer receiving, from a device driver, an input comprising an initial delta value determined by the device driver;
    the computer receiving input comprising an initial acceleration value set by a user for an input device and an initial threshold value set by the user for the input device;
    the computer calculating multiple acceleration and threshold values based on the initial acceleration value and the initial threshold value set by the user for the input device;
    the computer locating the initial delta value in a data structure;
    the computer selecting a new delta value associated with the initial delta value within the data structure, wherein the new delta value is a fixed point arithmetic value that the computer calculates using the multiple acceleration and threshold values based on the initial acceleration value and the initial threshold value set by the user for the input device, and wherein new delta values are sub-pixel values, and wherein the multiple acceleration and threshold values based on the initial acceleration value and the initial threshold value set by the user for the input device include three acceleration values that the computer calculates to gradually increase a mouse movement using sub-pixel movements based on the initial acceleration value and the initial threshold value set by the user for the input device using fixed point arithmetic, and wherein the computer uses a fourth value to calculate the new delta values using an acceleration value that is less than or equal to one and that is half the initial acceleration value set by the user for the input device;
    the computer calculating a new position of a pointer in the graphical user interface environment based on the new delta value; and
    the computer sending the new position of the pointer to the graphical user interface environment for rendering.

2. The computer implemented method of claim 1, further comprising:
    the computer calculating a first plurality of new delta values and a first plurality of new threshold values that correspond to the first plurality of new delta values based on the initial acceleration value and the initial threshold value set by the user for the input device; and
    the computer creating the data structure that comprises entries for initial delta values and corresponding new delta values based on the first plurality of new threshold values and the first plurality of new delta values.

3. The computer-implemented method of claim 2, further comprising:
    the computer receiving at least one of an updated acceleration value and an updated threshold value for the input device;
    the computer responsive to receiving at least one of an updated acceleration value and an updated threshold value for the input device, calculating a second plurality of new delta values and a second plurality of new threshold values that correspond to the second plurality of new delta values based on the at least one of the updated acceleration value and the updated threshold value; and
    the computer updating the data structure with entries for initial delta values and corresponding new delta values based on the second plurality of new threshold values and the second plurality of new delta values.

4. The computer implemented method of claim 2, wherein the first plurality of new threshold values comprise five threshold values.

5. The computer implemented method of claim 1, wherein the initial delta value and the new delta value correspond to a change in a position of the pointer in an x-axis of the graphical user interface environment.

6. The computer implemented method of claim 1, wherein the initial delta value and the new delta value correspond to a change in a position of the pointer in a y-axis of the graphical user interface environment.

7. A computer program product for moving a pointer in a graphical user interface environment, the computer program product comprising:
    a non-transitory computer readable storage device having computer usable program code tangibly embodied thereon that is executable by a computer, the computer usable program code comprising:
    computer usable program code for receiving, from a device driver, an input comprising an initial delta value determined by the device driver;

computer usable program code for receiving input comprising an initial acceleration value set by a user for an input device and an initial threshold value set by the user for the input device;

computer usable program code for calculating multiple acceleration and threshold values based on the initial acceleration value and the initial threshold value set by the user for the input device;

computer usable program code for locating the initial delta value in a data structure;

computer usable program code for selecting a new delta value associated with the initial delta value within the data structure, wherein the new delta value is a fixed point arithmetic value that the computer calculates using the multiple acceleration and threshold values based on the initial acceleration value and the initial threshold value set by the user for the input device, and wherein new delta values are sub-pixel values, and wherein the multiple acceleration and threshold values based on the initial acceleration value and the initial threshold value set by the user for the input device include three acceleration values that the computer calculates to gradually increase a mouse movement using sub-pixel movements based on the initial acceleration value and the initial threshold value set by the user for the input device using fixed point arithmetic, and wherein the computer uses a fourth value to calculate the new delta values using an acceleration value that is less than or equal to one and that is half the initial acceleration value set by the user for the input device;

computer usable program code for calculating a new position of a pointer in the graphical user interface environment based on the new delta value; and computer usable program code for sending the new position of the pointer to the graphical user interface environment for rendering.

8. The computer program product of claim 7, further comprising:

computer usable program code for calculating a first plurality of new delta values and a first plurality of new threshold values that correspond to the first plurality of new delta values based on the initial acceleration value and the initial threshold value set by the user for the input device; and computer usable program code for creating the data structure that comprises entries for initial delta values and corresponding new delta values based on the first plurality of new threshold values and the first plurality of new delta values.

9. The computer program product of claim 8, further comprising:

computer usable program code for receiving at least one of an updated acceleration value and an updated threshold value for the input device;

computer usable program code for, responsive to receiving at least one of an updated acceleration value and an updated threshold value for the input device, calculating a second plurality of new delta values and a second plurality of new threshold values that correspond to the second plurality of new delta values based on the at least one of the updated acceleration value and the updated threshold value; and computer usable program code for updating the data structure with entries for initial delta values and corresponding new delta values based on the second plurality of new threshold values and the second plurality of new delta values.

10. The computer program product of claim 8, wherein the first plurality of new threshold values comprise five threshold values.

11. The computer program product of claim 7, wherein the initial delta value and the new delta value correspond to a change in a position of the pointer in an x-axis of the graphical user interface environment.

12. The computer program product of claim 7, wherein the initial delta value and the new delta value correspond to a change in a position of the pointer in a y-axis of the graphical user interface environment.

13. A data processing system for moving a pointer in graphical user interface environment, the data processing system comprising:

a bus;

a storage device connected to the bus, wherein the storage device contains computer usable code; and a processing unit connected to the bus, wherein the processing unit executes the computer usable code to receive, from a device driver, an input comprising an initial delta value determined by the device driver; receive input comprising an initial acceleration value set by a user for an input device and an initial threshold value set by the user for the input device; calculate multiple acceleration and threshold values based on the initial acceleration value and the initial threshold value set by the user for the input device; locate the initial delta value in a data structure; select a new delta value associated with the initial delta value within the data structure, wherein the new delta value is a fixed point arithmetic value that the processor calculates using the multiple acceleration and threshold values based on the initial acceleration value and the initial threshold value set by the user for the input device, and wherein new delta values are sub-pixel values, and wherein the multiple acceleration and threshold values based on the initial acceleration value and the initial threshold value set by the user for the input device include three acceleration values that the processor calculates to gradually increase a mouse movement using sub-pixel movements based on the initial acceleration value and the initial threshold value set by the user for the input device using fixed point arithmetic, and wherein the processor uses a fourth value to calculate the new delta values using an acceleration value that is less than or equal to one and that is half the initial acceleration value set by the user for the input device; calculate a new position of a pointer in the graphical user interface environment based on the new delta value; and send the new position of the pointer to the graphical user interface environment for rendering.

14. The data processing system of claim 13, wherein the processing unit further executes the computer usable code to calculate a first plurality of new delta values and a first plurality of new threshold values that correspond to the first plurality of new delta values based on the initial acceleration value and the initial threshold value set by the user for the input device; and create the data structure that comprises entries for initial delta values and corresponding new delta values based on the first plurality of new threshold values and the first plurality of new delta values.

15. The data processing system of claim 14, wherein the processing unit further executes the computer usable code to receive at least one of an updated acceleration value and an updated threshold value for the input device; responsive to receiving at least one of the updated acceleration value and the updated threshold value for the input device, calculate a second plurality of new delta values and a second plurality of new threshold values that correspond to the second plurality of new delta values based on the at least one of the updated acceleration value and the updated threshold value; and update the data structure with entries for the initial delta values and corresponding new delta values based on the second plurality of new threshold values and the second plurality of new delta values.

16. The data processing system of claim 14, wherein the first plurality of new threshold values comprise five threshold values.

17. The data processing system of claim 13, wherein the initial delta value and the new delta value correspond to a change in a position of the pointer in an x-axis of the graphical user interface environment.

18. The computer implemented method of claim 1, wherein the computer calculates a fifth value that is a threshold value based on the initial acceleration value set by the user for the input device and is greater than or equal to 30 and less than or equal to 120.

19. The computer program product of claim 7, wherein the computer calculates a fifth value that is a threshold value based on the initial acceleration value set by the user for the input device and is greater than or equal to 30 and less than or equal to 120.

20. The data processing system of claim 13, wherein the processor calculates a fifth value that is a threshold value based on the initial acceleration value set by the user for the input device and is greater than or equal to 30 and less than or equal to 120.

* * * * *